CAMERA TUBE OF THE KIND COMPRISING A SEMICONDUCTIVE TARGET PLATE TO BE SCANNED BY AN ELECTRON BEAM

Original Filed Dec. 5, 1960 3 Sheets-Sheet 1

INVENTOR.
FRANCOIS DESVIGNES
BY
Frank R. Trifari
AGENT

INVENTOR.
FRANCOIS DESVIGNES
BY
Frank R Trifari
AGENT

INVENTOR.
FRANCOIS DESVIGNES
BY
Frank R. Trifari
AGENT

United States Patent

Re. 28,388
Reissued Apr. 8, 1975

28,388

CAMERA TUBE OF THE KIND COMPRISING A SEMI-CONDUCTIVE TARGET PLATE TO BE SCANNED BY AN ELECTRON BEAM

Francois Desvignes, Bourg-la-Reine, France, assignor to North American Philips Company, Inc., New York, N.Y.

Original No. 3,322,955, dated May 30, 1967, Ser. No. 522,743, Jan. 24, 1966, which is a continuation of abandoned application Ser. No. 73,879, Dec. 5, 1960. Application for reissue July 5, 1968, Ser. No. 747,046 Claims priority, application France, Dec. 24, 1959, 814,093

Int. Cl. H01j *29/70*

U.S. Cl. 315—10 9 Claims

Matter enclosed in heavy brackets [ ] appears in the original patent but forms no part of this reissue specification; matter printed in italics indicates the additions made by reissue.

*ABSTRACT OF THE DISCLOSURE*

*A camera tube employing a radiation sensitive target having a mosaic of elements formed by N-P junctions in a plate of semi-conductive material. In one embodiment two N-P junctions are back-to-back whereas in another embodiment, portions of n-conductivity type separating portions of p-type conductivity and exposed to an electron beam are covered by silicon oxide.*

This application is a continuation of application Ser. No. 73,879 filed Dec. 5, 1960 and now abandoned.

The invention relates to a camera tube comprising a radiation-sensitive target plate of semi-conductive material to be scanned by an electron beam, this plate being in contact with a signal electrode and having two P–N junctions of opposite senses, lying one behind the other viewed in the direction of thickness of the plate.

In a known camera tube of the kind set forth, the target plate is formed by three parallel layers of a material having a high resistivity, particularly lead monoxide, these layers having the desired conductivity type by deviation from the stoichiometric composition of the material or by the introduction to foreign atoms.

The invention has for its object to provide a camera tube of the kind set forth, which has a higher sensitivity than the known tube and in which the target plate may be made of materials which, compared with the material used for the known tube, may have a considerably lower resistivity, so that the number of materials from which a choice can be made for the target plate of the tube is extended.

In accordance with the invention the target plate consists of a mosaic of separate elements, each consisting of two regions of semi-conductive material of the same conductivity type, separated by a region of opposite conductivity type, while at most the region adjacent the signal electrode forms part of a more or less closed layer comprising corresponding regions of further mosaic elements and the thickness of the intermediate region of opposite conductivity has a value which is smaller than the effective diffusion length of the minority carriers therein.

The spliting up of the target plate forming an uninterrupted layer in the known structure into separate elements substantially without any interconnection in accordance with the invention results in that, when using a target plate material having a comparatively low resistivity the picture definition, which would otherwise be disturbed by the transverse conduction in the target plate, is not adversely affected. By providing the given small thickness of the intermediate layer of opposite conductivity type in each mosaic element, it is insured that, as with transistors, a sufficient supply of minority carriers through this layer takes place, which brings about a higher sensitivity of the target plate.

The invention will now be described with reference to the drawing, which shows a few embodiments, in which.

Figure 1:
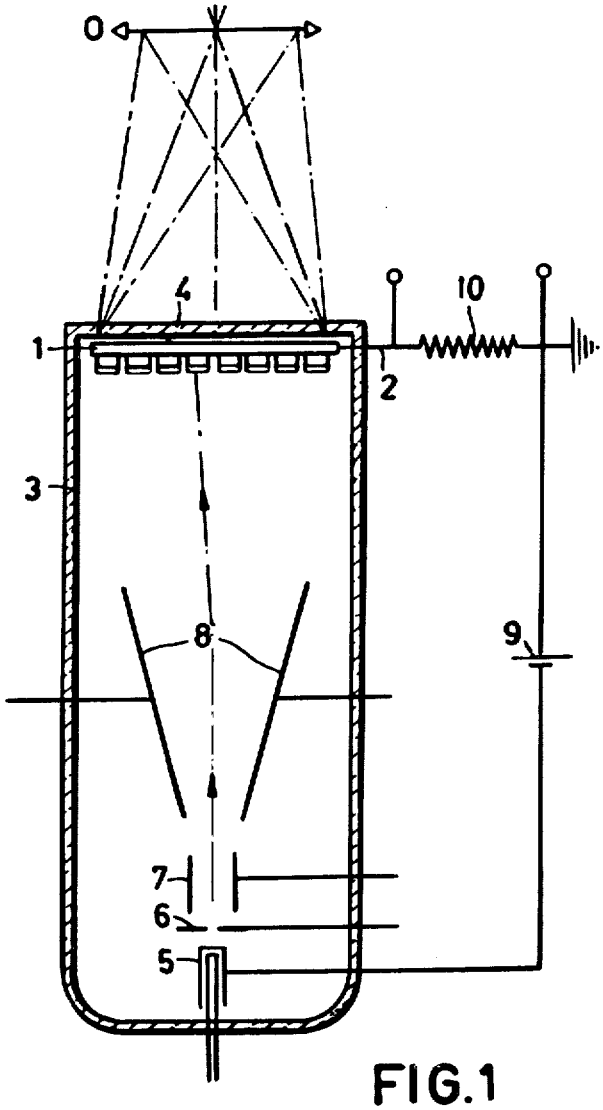
FIG. 1 is a sectional view of a camera tube according to the invention.

The camera tube shown in FIG. 1 comprises, inside the evacuated bulb 3, a target plate 1, of which the structure will be described hereinafter with reference to FIG. 2. This target plate 1 is in electrical contact with a signal electrode 2 consisting of a thin transparent and conductive layer, for example, of metal. The target plate 1 with the signal electrode 2 is applied to a window 4 of the bulb 3, in which is arranged, opposite this window an electron gun of the conventional type having cathode 5, a Wehnelt cylinder 6 and a focussing electrode 7. The tube comprises furthermore a deflection system for the horizontal and vertical deflections of the electron beam emanating from the electron gun, directed towards the target plate 1. This deflection system is indicated diagrammatically in FIG. 1 by a single pair of plates 8.

The cathode 5 and the signal electrode 2 are connected to a voltage source 9 supplying a constant voltage, in series with the signal resistor 10, from which the image signal to be supplied by the tube is obtained. Owing to the voltage source 9 the signal electrode 2 is at positive potential relative to the cathode 5. The voltage between this cathode and the signal electrode 2 is usually chosen to be of the order of ten volts.

Figure 2:
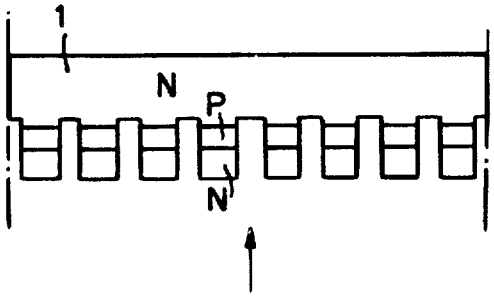
FIG. 2 shows diagrammatically part of the sectional view of the target plate of the tube illustrated in FIG. 1.

FIG. 2 shows diagrammatically part of the section of a target plate 1. It is formed in this case by a monocrystal layer N of n-type silicon, on the surface of which is provided a great number of separate stratified domains P of p-type conductivity. Each of these domains P is in contact, on the electron-gun side, with a stratified domain N′ of n-type conductivity. The spacing between the separate domains P and the separate domains N′ provides on the target plate, at least on the side facing the electron gun, a mosaic of discrete elements, each of which has two opposite N-P junctions. The thickness of the domains P is chosen so that it is smaller than the effective diffusion length of the minority carriers, in this case electrons, therein.

When the target plate 1 is scanned by the electron beam emanating from the electron gun, the domains N′ are stablized at the potential of the cathode 5, so that at each mosaic element of the target plate a voltage difference is produced. In the dark a mosaic element will discharge between two successive scans to a greater or smaller extent by the so-called dark current. By the choice of the semi-conductive material used in the target plate 1 and of the operational temperature of the target plate, this dark current can be kept so low that the discharge takes place with a time constant which is great as compared with the duration of an interval between two successive scans of the same mosaic element. In this case the elements of the target plate will in the dark retain substantially a constant charge.

However, if on the target plate 1 an optical image is formed through the window 4 of the bulb 3, for examole, by means of an optical system O, of which image he photons liberate in the target plate pairs of hole-electrons, the holes will tend to lodge themselves in the domains P. They thus reduce the potential difference between the domains N′ and P, so that electrons can flow more easily out of the domains N′ into a subjacent domain P, whereafter owing to the small thickness of the domains P as compared with the diffusion length of the electrons in the material of these domains, they will for the larger part travel into the region N adjoining the signal plate 2. Thus the formation of a number of holes in a mosaic element produces an electron current from the domain N′ towards the domain N, in which the number of electrons exceeds the said number of holes. The ratio between the number of electrons wandering from a domain N′ towards a domain N and the number of holes in the intermediate domain P effecting this electron stream and formed by the incident radiation is equal to the amplification factor $\alpha'$ of the N-P-N structure operating as a phototransistor. The domains N′, P and N play the role of an emitter, a base and a collector respectively of a phototransistor.

The formation of holes in a mosaic element results therefore in a discharge current additional to the dark current, which discharge current is proportional to the number of hole-electron pairs produced by the captured radiation, added to the dark current. If the dark current is negligible, the discharge of an element is proportional to the number of radiation quanta captured by the said element in the time interval between two successive scans of the mosaic element by the electron beam.

During the scan by the electron beam emanating from the electron gun, each N′ domain captures such a number of electrons that the initial voltage difference at this element is restored. The capture of the beam electrons results in an instantaneous voltage difference across the signal resistor 10, which voltage difference is a measure of the discharge of the mosaic element concerned, and hence, for the number of radiation quanta absorbed by this element.

The N-P-N structure of the target plate in the tube according to the invention provides in this target plate an amplification which corresponds with the amplification obtained by a transistor driven by a very low current. Thus, the tube according to the invention has a sensitivity which materially exceeds that of tubes having a target plate with a single P-N junction.

Infrared-sensitive tubes may be obtained by using infrared-sensitive semi-conductive material in the target, for example germanium.

With silicon the threshold value of the spectral sensitivity lies at $1.1\mu$, with germanium this value may be $1.9\mu$ and with given known metal compounds this value may be aprroximately $8\mu$.

The layers obtainable from these materials exhibit, in general, too high a dark current at room temperature, but it is usually sufficient to provide a comparatively slight cooling to reduce the dark current to an adequately low value; with germanium, for example, the time constant under dark condition is about 1 sec. as soon as the temperature of the target plate is lower than −20° C.

Figure 3:
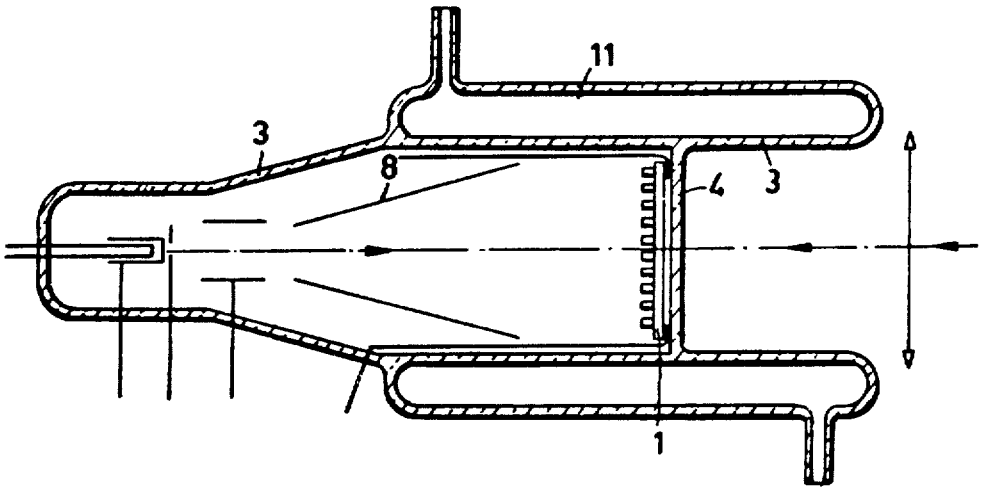
FIGS. 3 and 4 show diagrammatically embodiments of the tube according to the invention suitable for taking infrared pictures.

FIG. 3 shows diagrammatically a useful structure of a tube cooled by the circulation of a fluid in an external vessel 11. The bulb 3 of the tube shown in this figure is identical to that shown in FIG. 1.

It is not necessary to illuminate the target plate from the side remote from the electron gun. By illuminating the mosaic surface, i.e. the surface scanned by the electron beam, two advantages are obtained: a smaller diffusion of the picture, so that the resolving power is greater and the possibility of using thick screens with a large diameter.

Figure 4:
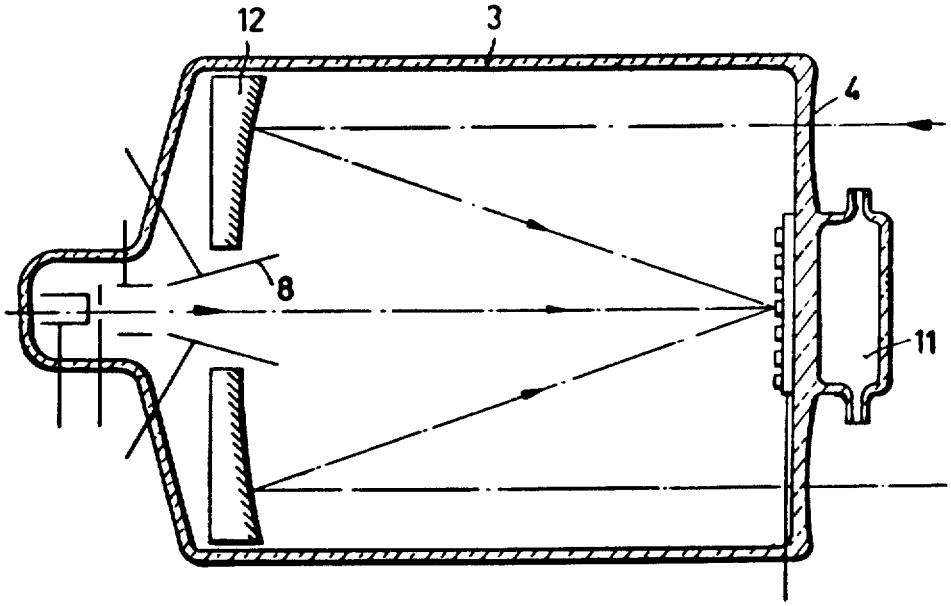

FIG. 4 shows an embodiment of the camera tube according to the invention in which a mirror optical system 12 is incorporated.

In this embodiment the window 4 may serve on the one hand as a correction lens (Schmidt- or Maksutow-lens) and on the other hand it may provide by direct contact the cooling of the plate of the target by means of the vessel 11. The further elements of the tube are designated by the same reference numerals as in FIG. 1.

Now a method of manufacturing a target plate for a tube according to the invention will be described. The method relates to a N-P-N structure on the basis of silicon.

Figure 5:
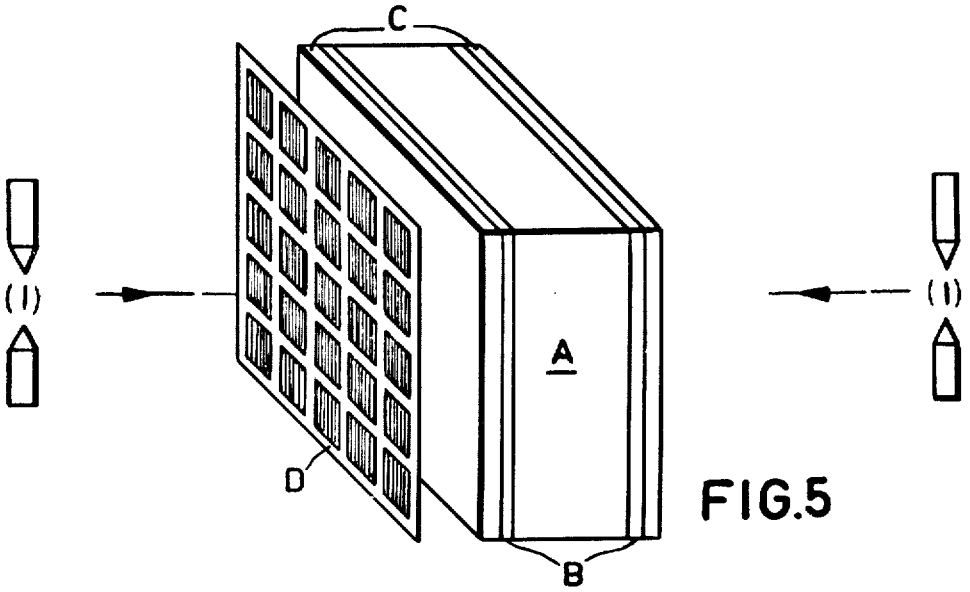
FIGS. 5, 6 and 7 illustrate various stages in the manufacture of a target plate of a tube according to the invention.
Figure 6:
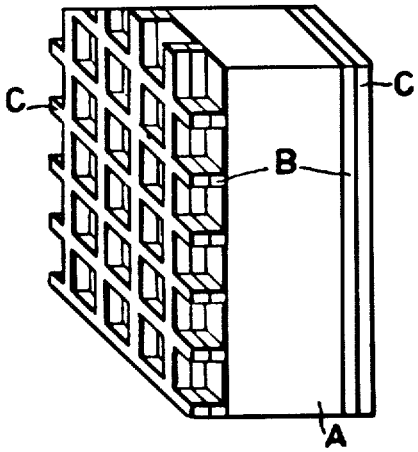

As shown in FIG. 5 a disc A of a diameter of 25 mms. and a thickness of 0.3 mm. is made in known manner by sawing and polishing from a silicon crystal of n-type conductivity and having a resistivity of 1 ohm-cm. The said disc is then etched by immersion into a mixture of hydrofluoric acid, nitric acid and acetic acid, so that the thickness is reduced to about 0.15 mm. The disc is subsequently introduced into a furnace, through which a flow of oxygen under atmospheric pressure is conveyed, while heating takes place at 1100° C. for one hour in order to form, on the surface, an impermeable silicon oxide layer B, having a thickness of about $1\mu$. Then the two surfaces of the disc are coated with a photo-sensitive lacquer layer C, which is exposed on one side via a mask D of a pattern of squares and on the other side uniformly over the entire surface. The non-exposed parts of the lacquer layer, i.e. the parts lying behind the small, opaque squares of the mask D, are then removed by means known in photography, after which the disc is immersed into the hydrofluoric acid to dissolve the silicon-oxide layer B at those areas where the lacquer layer C has been removed. On the front side, only that part of the silicon-oxide layer B remains which constitutes the raster pattern. In this stage the disc has the shape shown in a perspective view in FIG. 6. After rinsing, the exposed lacquer, in turn, is removed by means known in photography, after which arsenic and boron are caused to diffuse simultaneously into the disc. From a technique used in the manufacture of transistors, it is known that with a suitably chosen concentration of arsenic and boron in the flow of gas conveyed over the disc, penetration depths are obtained which are sharply different from each other, so that after a given diffusion time, n-type conductivity is obtained in the squares of the disc surface exposed to the flow of gas owing to the arsenic atoms, and p-type conductivity in the subjacent layer owing to the boron atoms. Underneath the last-mentioned layer is located the silicon layer of n-type conductivity.

Figure 7:
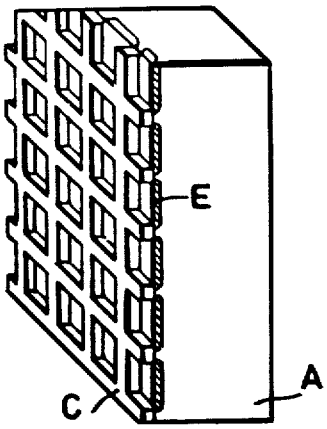

After the mosaic surface exposed to the diffusion effect has been coated with a protective layer, for example of lacquer, the silicon-oxide layer on the rear side of the disc is removed by immersing it in hydrofluoric acid, and after the protective lacquer layer has been removed from the front side, the silicon is removed from the separate elements and from the rear side of the disc by electrolysis in a diluted potassium solution. Then a target plate is obtained, of which the structure is shown in a sectional view in FIG. 7, in which E designates diffusion having n-type conductivity at the surface and p-type conductivity underneath.

The silicon-oxide pattern on the front side of the plate has restricted the diffusion of boron and arsenic to small, separate squares, which exhibit a checkerboard pattern. By maintaining this silicon-oxide grid, I have prevented the initial disc material, which has n-type conductivity, from directly receiving electrons of the scanning beam. The method described may also be carried out for producing N-P-N structures by causing other substances, for example, phosphorus and gallium, to diffuse simultaneously or successively. The surface layer of n-type conductivity of the diffusion domains struck by the scanning beam and constituting the emitter has the highest degree of doping of the three domains, whereas the original material of the disc with the lowest degree of doping constitutes the collector.

In a further method of manufacturing a target plate, an n-type conductivity layer is coated by surface layers of p- and n-type conductivity respectively. Thus a structure is obtained which exhibits uninterrupted layers of small thickness, while in the direction of thickness in n- and p-type conductivity on an n-type surface are obtained. By means of a photo-sensitive layer and a mask with a suitable pattern of openings as the aforesaid method, given domains of the surface layers of p- and n-type conductivities may be etched away sharply by means of an acid, so that the desired mosaic is obtained.

What is claimed is:

1. In a camera tube, a radiation sensitive target plate of semi-conductive material, said plate being in contact wtih a signal electrode and comprising a mosaic of separate elements, each of said elements having two regions of semi-conductive material of the same conductivity type separated by a region of opposite conductivity type thereby forming two opposite P-N junctions lying one behind the other in the direction of plate thickness, said semi-conductive region adjacent the signal electrode forming a substantially uninterrupted layer comprising corresponding regions of further mosaic elements, and wherein the thickness of the intermediate region of opposite conductivity type is smaller than the effective diffusion length of the minority carriers therein.

2. A camera tube as defined in claim 1, wherein the target plate comprises a monocrystal layer on which separate domains are formed by diffusion, said domains exhibiting at the surface the same conductivity type as the monocrystal layer and further having a region of opposite conductivity type separating the surface domains from the original material of said layer.

3. A camera tube as defined in claim 2, wherein the target plate further includes on the mosaic side thereof a grid-like oxide layer which covers the space between the separate domains.

4. A camera tube including a radiation sensitive target plate of semi-conductive material, said plate being in contact with a signal electrode and comprising a mosaic of separate elements, each of said elements having two regions of semi-conductive material of the same conductivity type separated by a region of opposite conductivity type thereby forming two opposite P-N junctions lying one behind the other in the direction of plate thickness, said semi-conductive region adjacent the signal electrode forming a substantially uninterrupted layer comprising corresponding regions of further mosaic elements, and wherein the thickness of the intermediate region of opposite conductivity type is smaller than the effective diffusion length of the minority carriers therein, and means to electrically scan said target and produce an electrical signal corresponding to an optical image formed on said target plate.

5. An electron discharge device comprising a light sensitive target electrode of semi-conductive material, means for producing an electron beam along a given axis, electron beam scanning means for said target electrode, said target electrode comprising a mosaic of storage elements, each of said elements having two regions of semiconductive material of the same conductivity type separated by an intermediate region of opposite conductivity type thereby forming two opposite P-N junctions lying one behind the other in the direction of said beam axis, the thickness of said intermediate region being less than the effective diffusion length of the minority carriers therein, said intermediate region being shielded from contact with said electron beam by one of said two regions of the same conductivity type, each of said elements being capable of storing an electric charge and having a discharge time variable with the amount of illumination on said element, means for reverse biasing one of said regions of the same conductivity type, means for illuminating one of said two regions of the same conductivity type with light energy, and a signal electrode connected to the target electrode.

6. An electron discharge device comprising an electron gun for producing an electron beam along a given axis and a radiation sensitive target member disposed in the path of said electron beam, electron beam scanning means for deflecting said beam over said target, said target member comprising a mosaic of semi-conductor elements, each of said elements further comprising pair of outer zones of semi-conductor material of a first conductivity type and an intermediate zone of semi-conductor material of a second conductivity type positioned between and contiguous with said outer zones thereby forming two opposed P-N junction transverse to said electron beam axis, said intemediate zone having a thickness which is less than the effective diffusion length of minority carriers in said zone, one of said outer zones substantially shielding said intermediate zone from contact with said scaned electron beam, means for illuminating one of said outer zones with radiation energy to which said target is sensitive, and a load circuit electrically connected to said target member for deriving an electric signal determined by the radiation energy striking said target.

7. An electron discharge device comprising an electron gun for producing an electron beam along a given axis and a radiation sensitive target plate disposed in the path of said electron beam, electron beam scanning means for deflecting said beam over said target, said target plate comprising a mosaic of discrete semi-conductor elements, each of said elements comprising two regions of semi-conductor material of a first conductivity type separated by an intermediate region of semi-conductor material of a second conductivity type thereby forming two opposed P-N junctions lying one behind the other in the direction of said electron beam axis, said intermediate region of second conductivity type having a thickness which is less than the effective diffusion length of the minority carriers in said region, means for illuminating one of said two regions of first conductivity type with radiation energy to which said target is sensitive, and means connected to said target plate for deriving an electric signal.

8. An electron discharge device comprising an electron gun having a cathode for producing an electron beam along a given axis and a target plate responsive to radiant energy transversely disposed in the path of said electron beam, means for scanning said electron beam over the surface of said target plate, said target plate of a semi-conductive material having a zone of a first conductivity type having a given cross-sectional area and forming a discontinuous surface facing said electron beam, a second zone of semi-conductor material of a different conductivity type of equal cross-sectional area positioned behind and contiguous to said first zone and shielded from said electron beam by said first zone, a third zone of semi-conductor material of said first conductivity type positioned behind and contiguous to said second zone and forming a second surface of said target plate, said first and second zones and said second and third zones each forming a P-N junction transverse to said electron beam axis, said second zone having a thickness dimension in the direction of said beam axis which is less than the effective diffusion length of the minority carriers therein, an electrical contact on said third zone, an impedance element and a source of direct current operating voltage, means for connecting said voltage source and said impedance element in series circuit between said cathode and said third zone electrical contact, and means for illuminating one surface of said target plate with said radiant energy.

*9. In combination; a target structure comprising a semi-conductve wafer, the wafer including adjacent one surface thereof an array of discrete rectifying barriers surrounded by regions free of rectifying barriers; insulating means coating said surface selectively at portions overlying regions free of rectifying barriers and leaving exposes portions overlying the rectifying barriers; means for forming and projecting an electron beam for scanning said one sur-*

*face of the wafer; and means for projecting an image to be recorded on the surface of the wafer opposite the one surface.*

References Cited

The following references, cited by the Examiner, are of record in the patented file of this patent or the original patent.

UNITED STATES PATENTS

| | | | |
|---|---|---|---|
| 2,669,635 | 2/1954 | Pfann | 250—211 |
| 2,780,765 | 2/1957 | Chapin et al. | 250—211 X |
| 2,790,088 | 4/1957 | Shive | 250—211 |

| | | | |
|---|---|---|---|
| 2,812,446 | 11/1957 | Pearson | 250—211 |
| 2,886,739 | 5/1959 | Matthews et al. | 313—65 X |
| 3,011,089 | 11/1961 | Reynolds | 313—65 X |
| 3,020,438 | 2/1962 | Sziklai | 250—211 X |
| 3,046,405 | 7/1962 | Emeis | 250—211 |

MAYNARD R. WILBUR, Primary Examiner

J. M. POTENZA, Assistant Examiner

U.S. Cl. X.R.

313—367